United States Patent
Cuccias et al.

(10) Patent No.: US 7,416,155 B2
(45) Date of Patent: Aug. 26, 2008

(54) CANARD POSITION AND DIHEDRAL FOR BOOM REDUCTION AND PITCH/DIRECTIONAL CONTROL

(75) Inventors: Robert S. Cuccias, Lancaster, CA (US); John M. Morgenstern, Lancaster, CA (US); Alan E. Arslan, Santa Clarita, CA (US); Howard Lee, Monterey Park, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 599 days.

(21) Appl. No.: 11/147,636

(22) Filed: Jun. 7, 2005

(65) Prior Publication Data
US 2006/0237580 A1    Oct. 26, 2006

Related U.S. Application Data

(63) Continuation-in-part of application No. 10/652,128, filed on Aug. 29, 2003, now abandoned.

(51) Int. Cl.
*B64C 30/00* (2006.01)

(52) U.S. Cl. .................... 244/35 A; 244/1 N
(58) Field of Classification Search ............... 244/35 A, 244/45 A, 15, 1 N, 130
See application file for complete search history.

(56) References Cited

U.S. PATENT DOCUMENTS 6,729,577 B2 * 5/2004 Morgenstern ............. 244/45 R

OTHER PUBLICATIONS http://www.faqs.org/docs/air/avgrpn.html, the gripen aircraft.*

* cited by examiner

*Primary Examiner*—Timothy D Collins
(74) *Attorney, Agent, or Firm*—Koestner Bertani LLP

(57) ABSTRACT

A supersonic aircraft comprises a fuselage extending forward and aft, wings coupled to lateral sides of the fuselage, and canards coupled to lateral sides of the fuselage forward of the wings. The individual canards are configured to generate shocks that wrap around the fuselage and intersect with wing leading edges on opposing sides of the fuselage.

20 Claims, 17 Drawing Sheets

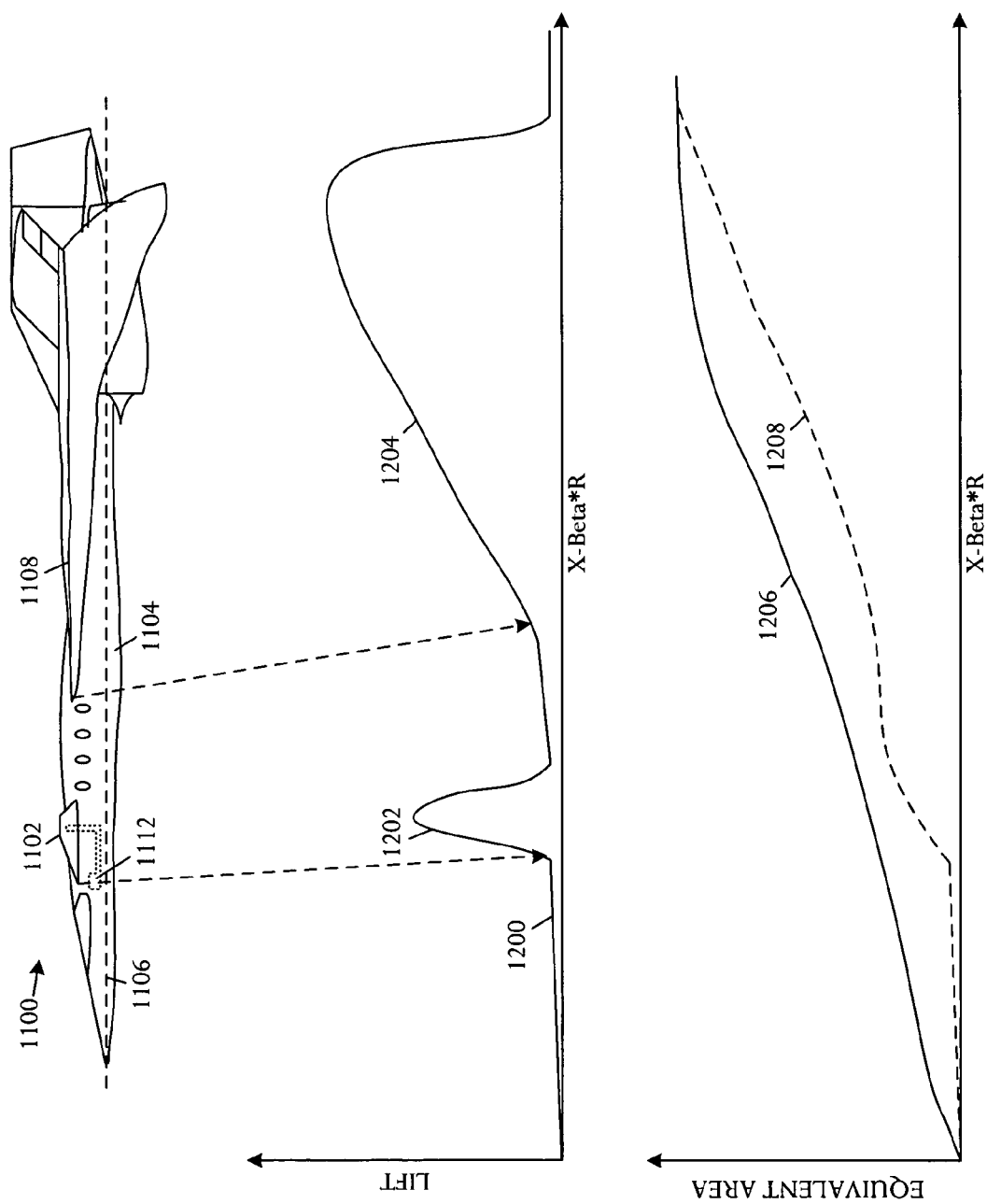

CANARD POSITION AND DIHEDRAL FOR BOOM REDUCTION AND PITCH/DIRECTIONAL CONTROL

BACKGROUND OF THE INVENTION

The global economy makes long range business travel more essential than ever. However, other than Concorde, with presence declining as transatlantic flights have discontinued, the pace of business travel remains at 1960's-era speeds. Technology advances have produced longer range, safer, and more comfortable aircraft—but not faster flights.

Supersonic overland capability and range are drivers of market potential for aircraft in the commercial and business sector. Buyers of supersonic commercial aircraft are expected to be from entities such as corporations, governments and government agencies, and high net-worth individuals. Most operators are expected to be large organizations, for example corporations and governments, with sophisticated flight departments that can manage multiple aircraft types. Flights are expected to depart and arrive in a wide range of environments, from large international and national airports to small local airfields or suburban airports, with or without substantial service capabilities.

Although a supersonic aircraft for usage in commercial and business environments is to have many characteristics of a high-performance military aircraft, flight characteristics, operations, maintenance, and cost should be compatible to a business or commercial realm. The aircraft should be compatible with the infrastructure, servicing and operations experience base, and air traffic control system of the extant civil business jet.

The user community expects the aircraft to be usable not only in large, urban international hubs but also in suburban airports so that compatibility with shorter runway lengths, narrower taxiways, and lower maximum gross weight surfaces is desirable. Servicing and maintenance compatibility with personnel, equipment, and capabilities found at well-equipped fixed based operators (FBOs) and maintenance facilities is highly useful.

Many of the desirable features of supersonic civilian aircraft, particularly low-boom performance and long range, are very difficult to attain. Bill Sweetman in "Flights of fancy take shape—from Jane's (www.janes.com)", 21 Jul. 2000, discusses the United States Defense Advanced Research Projects Agency (DARPA) Quiet Supersonic Platform (QSP) program that is intended to develop an efficient supersonic-cruise aircraft that does not produce a sonic boom. The difficulty of such a result is indicated by the agency's admission that only a revolutionary design will meet the goal, and that incremental application of new technologies, or integration of existing technologies, is expected to be insufficient to attain the reduced boom goal.

Extension of aircraft range involves balancing of fuel capacity, payload volume, fuel consumption at desired speeds, aerodynamic, and other factors. Reduction of aerodynamic drag can assist in extending range, reducing sonic boom, and improving aircraft performance.

SUMMARY OF THE INVENTION

What are desired are an aircraft and constituent components that enable supersonic flight by applying new technologies and an innovative aircraft design approach. What is further desired is an aircraft that can significantly reduce travel times, for example by a factor of two through supersonic cruise speed capability, while retaining extending cruise ranges and spacious passenger comfort. In various embodiments, the speed advantage can be achieved with an environmentally-friendly design, compliant with takeoff and landing noise standards, engine emission requirements, and producing a very soft sonic signature during supersonic flight.

In accordance with some embodiments, a supersonic aircraft comprises a fuselage extending forward and aft, wings coupled to lateral sides of the fuselage, and canards coupled to lateral sides of the fuselage forward of the wings. The individual canards are configured to generate shocks that wrap around the fuselage and intersect with wing leading edges on opposing sides of the fuselage.

BRIEF DESCRIPTION OF THE DRAWINGS

Embodiments of the invention relating to both structure and method of operation, may best be understood by referring to the following description and accompanying drawings.

FIG. 12 is a graph and schematic pictorial view of an aircraft showing an example of a technique for minimizing or reducing sonic boom effects using the canard.

DETAILED DESCRIPTION OF THE EMBODIMENTS

Figure 1A:
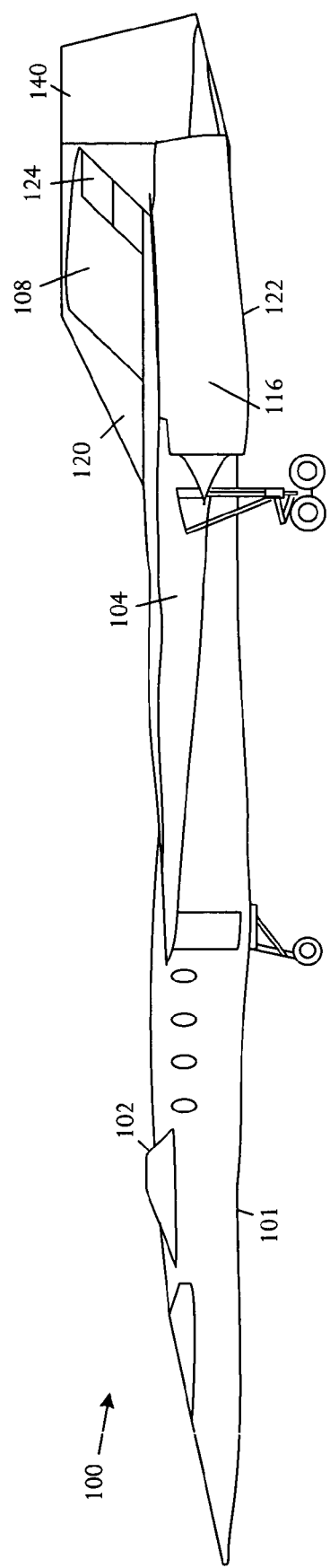
FIGS. 1A, 1B, and 1C are schematic pictorial diagrams that respectively illustrate side, front, and top views of an embodiment of a supersonic aircraft with canard position, dihedral, and differential deflection for sonic boom reduction, and pitch and directional control.
Figure 1B:
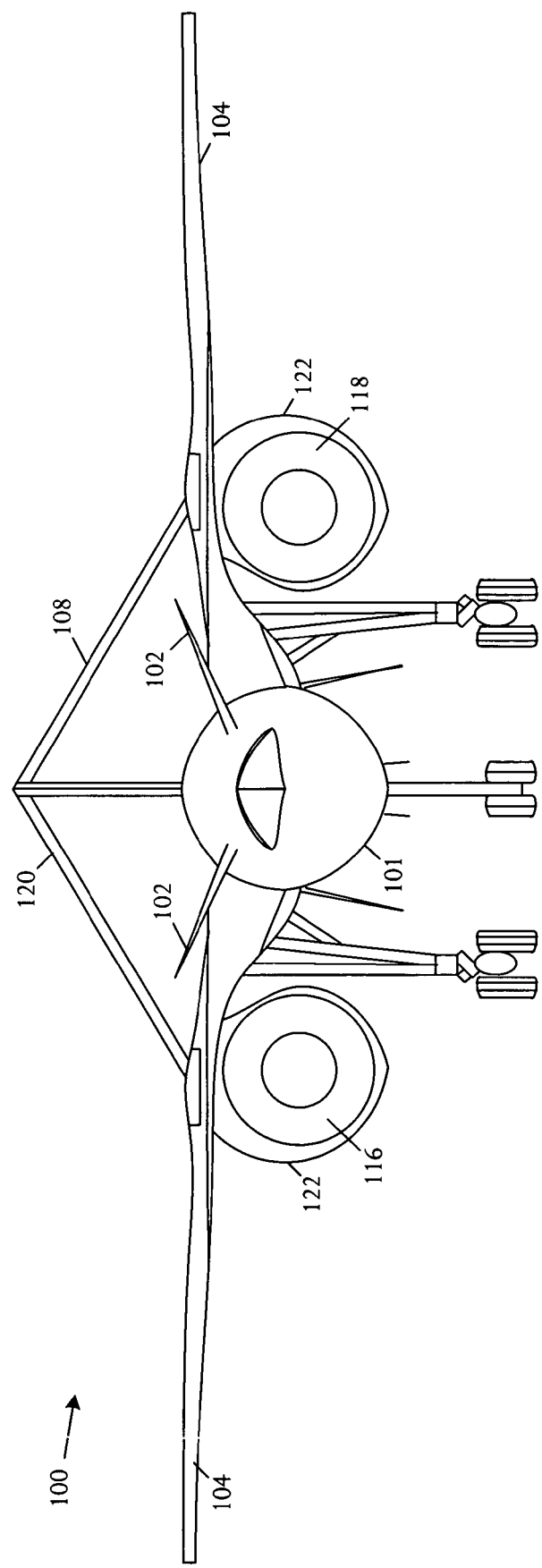
Figure 1C:
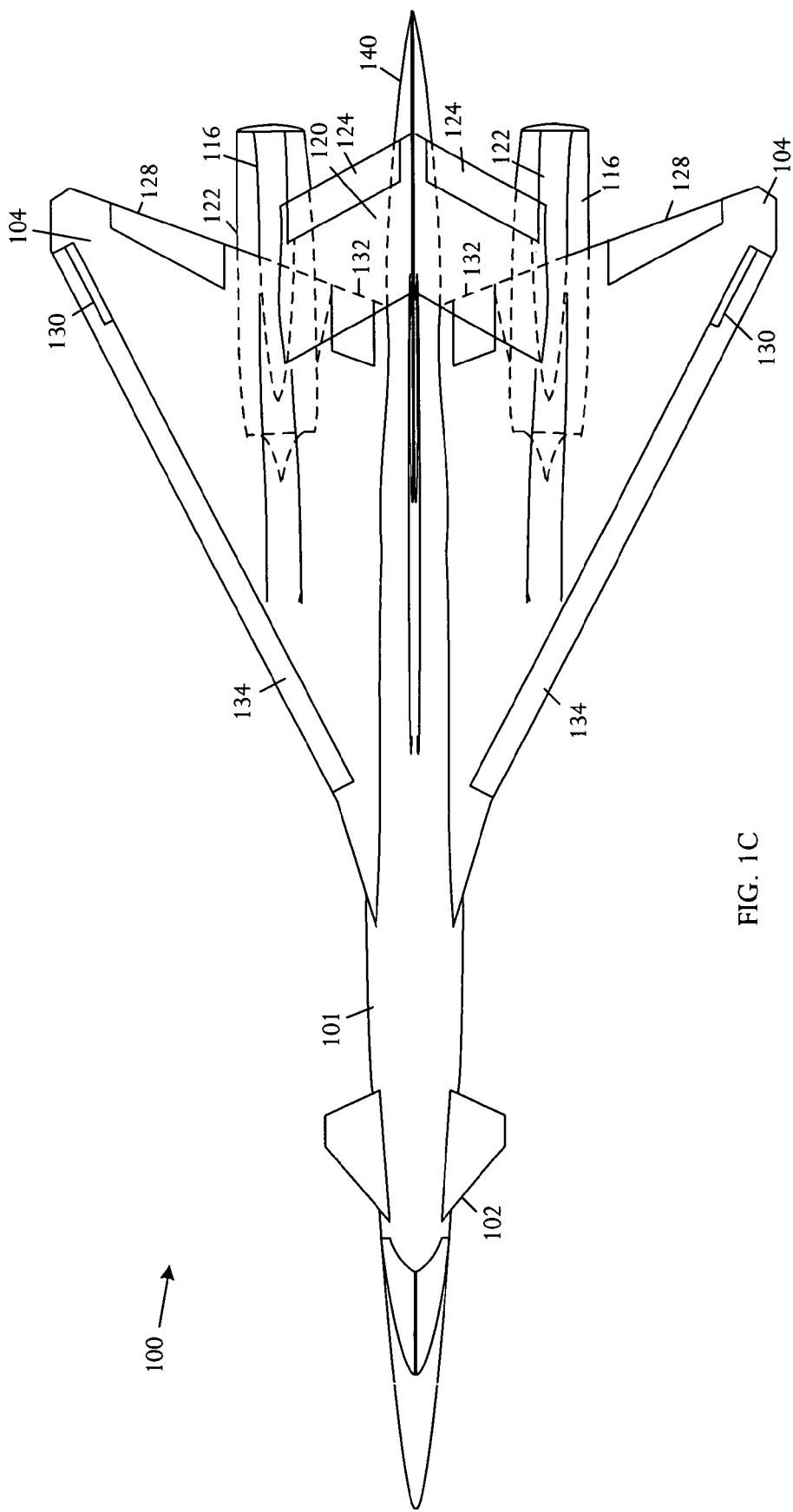

Referring to FIGS. 1A, 1B, and 1C, schematic pictorial diagrams respectively showing side, front, and top views of an embodiment of a supersonic aircraft 100. The aircraft 100 comprises the fuselage 101 extending forward and aft along a longitudinal axis and having a lower surface and an upper surface. A wing 104 is coupled to the fuselage 101. The aircraft 100 has a canard 102 coupled onto the fuselage 101 at a position forward of the wing 104 at an elevated location. The elevated positioning of the canard 102 on the fuselage 101 enables stretching of the aircraft lifting length, resulting in an effective area distribution that attains a shaped sonic boom signature.

The canards 102 have a dihedral that is sufficiently high to increase the aircraft lifting length and attain a target equivalent area distribution for low sonic boom performance. The canard 102 operates as a longitudinal power control device that is particularly effectively during takeoff and in high-speed flight. The canard 102 also functions to fine tune the aircraft longitudinal trim condition. The canard 102 augments rudder operation by supplying yaw control power when left and right canard surfaces are deflected differentially.

Figure 2:
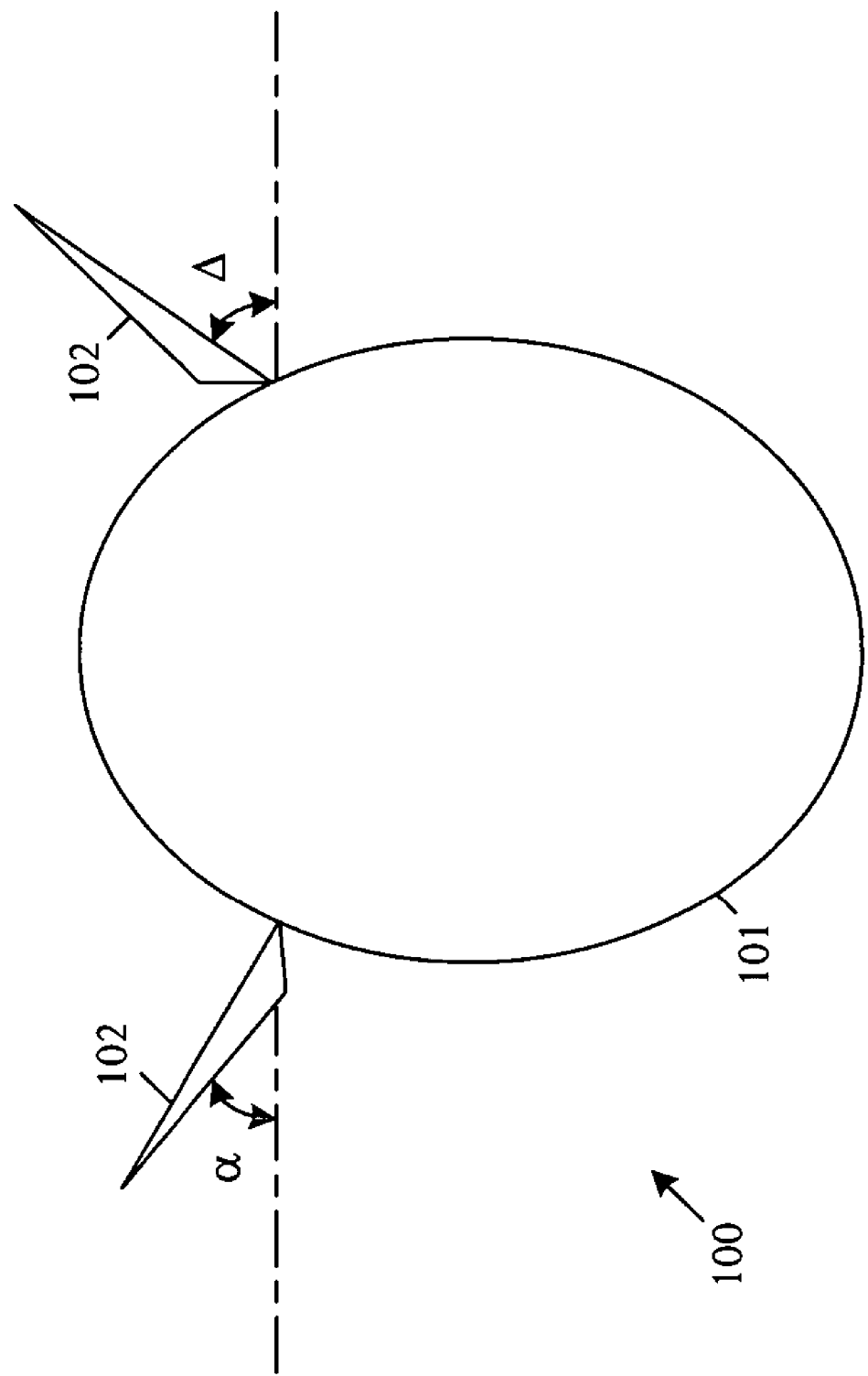
FIG. 2 is a highly schematic pictorial diagram showing an aircraft frontal with differential canard deflection.

In the illustrative embodiment, the canards 102 can be controlled with differential deflections to enable directional control. Referring to FIG. 2, a frontal view of the aircraft 100 shows an aircraft 100 with two canards 102 coupled to opposing sides of the fuselage 101 at the elevated position on the body 101. The high dihedral of the canards 102 and differential deflection to exploit asymmetric lift on the canards for directional control. The canards 102 can be differentially controlled to deploy at different angles, or the same angle, illustrative shown as angles α and Δ.

Symmetric deflection of the canards 102 enables setting of the angles on different sides of the fuselage 101 and, in combination with the relatively high position of the canards 102 on the body 101, induces lift on the fuselage 101 and the wing 104 on respective opposing sides of the body 101, causing lift from the canard 126 and body lift to blend into lift produced by the wing 104.

Referring to FIG. 1C, control effectors are shown for the supersonic aircraft 100. Two sets of surfaces are available for pitch control including the canards 102 and ruddervators 124. Roll control uses ailerons 128 and high speed spoilers 130. Yaw control is supplied by a rudder 140, ruddervators 124, and differential canard 102.

In combination with the canards 102, the supersonic aircraft 100 has multiple stability and control effectors. The canard 102 and symmetric defections of the ruddervators 124 control pitch power. A vertical rudder 140 controls yaw. Inboard, midboard and outboard ailerons 128, and the high speed roll spoilers 130 control roll. The segmented ailerons 128 provide both roll control power and automatic wing camber control to optimize lift and drag throughout the flight envelope. The roll spoilers 130 are configured to control roll at supersonic Mach numbers. High-speed spoilers 130 supplement aileron roll power at transonic and supersonic speeds where Mach number and aeroelastic effects reduce aileron effectiveness.

In an illustrative embodiment, trailing edge (TE) flaps 132 are deployed 30° down to generate additional lift during landing. TE flap deployment reduces angle-of-attack specifications by approximately 2° during landing. During second-segment climb, the TE flaps 132 are extended 10° to improve the lift-to-drag ratio for better climb performance.

Leading edge (LE) Krueger flaps 134 are extended 130° for low speed operations including takeoff, approach and landing. The LE Krueger flaps 134 improve lift-to-drag ratio by 1.5, resulting in better climb performance that facilitates second-segment climb in case of engine malfunction.

In some embodiments, the aircraft 100 can be configured with a high lift system that includes simple inboard trailing edge flaps 132 and a full-span leading edge Krueger flaps 134. Some aircraft embodiments can have non-Krueger leading edge flaps.

The multiple control surfaces of the supersonic aircraft 100, for example the ruddervators 124 inboard and outboard design, enable continued operation and landing following single actuator failure or a single control surface jamming. Differential canard deflection can generate a yawing moment to counter a jammed rudder. Ailerons 128 and ruddervators 124 include multiple surfaces, increasing fault tolerant capability and supplying redundant elements for improved reliability.

Referring again to FIGS. 1A, 1B, and 1C, in the illustrative aircraft 100, shaping of the wing 104, body 101, empennage 120, and the integration of the propulsion system 116 are configured to produce a shaped sonic signature and control supersonic cruise drag. An inverted V-tail geometry 108 facilitates the overall low-boom design and supports nacelles 122 in an appropriate position relative to the wing 104, as well as enabling for trim to attain a low sonic-boom lift distribution. Inverted V-tail control surfaces, called ruddervators 124, adjust the aircraft longitudinal lift distribution throughout the flight envelope to maintain a low-boom, low-drag trim condition. The canard 102 supplies additional trim control and augments longitudinal control power.

In various embodiments, the illustrative aircraft 100 may include one or more of several advancements including addition of an all-flying canard 102, an optimized wing 104, incorporation of leading edge flaps 134 and spoilers 130, and a reconfigured body or fuselage 101. The canard 102 improves takeoff rotation and high-speed control. Wing planform and airfoil shapes are configured to assist high-speed performance, low-speed performance, low sonic boom, stability and control, and structural mass fraction characteristics. Sizes of the inverted V-tail 108 and fins can be configured to improve both structural and aerodynamic integration, benefiting both weight and drag characteristics. Flaps 134 improve takeoff performance. Spoilers 130 assist high-speed roll control.

The illustrative aircraft 100 has a twin-engine, slender-body configuration with a highly swept low aspect ratio wing 104, a configuration highly appropriate for low-boom performance. The aft engine location beneath the wing 104, in combination with a highly integrated wing/inlet geometry, produce both low-boom compatibility and low inlet/nacelle installation drag. The inverted V-tail geometry 108 supplies both a low sonic-boom performance while generating longitudinal trim in cruise, and structural support for the engine/nacelle installation.

Some embodiments of the aircraft 100 implement one or more of several features including a multi-spar wing 104, a fuselage structure 101 with stringer-stiffened skins supported by frames, canards 102 that are integrated with the pressurized fuselage cabin structure, and aft-located engines 116 supported by a torque-box structure that extends aft of the wing 104 and is attached to the inverted V-tails 108.

Figure 3:
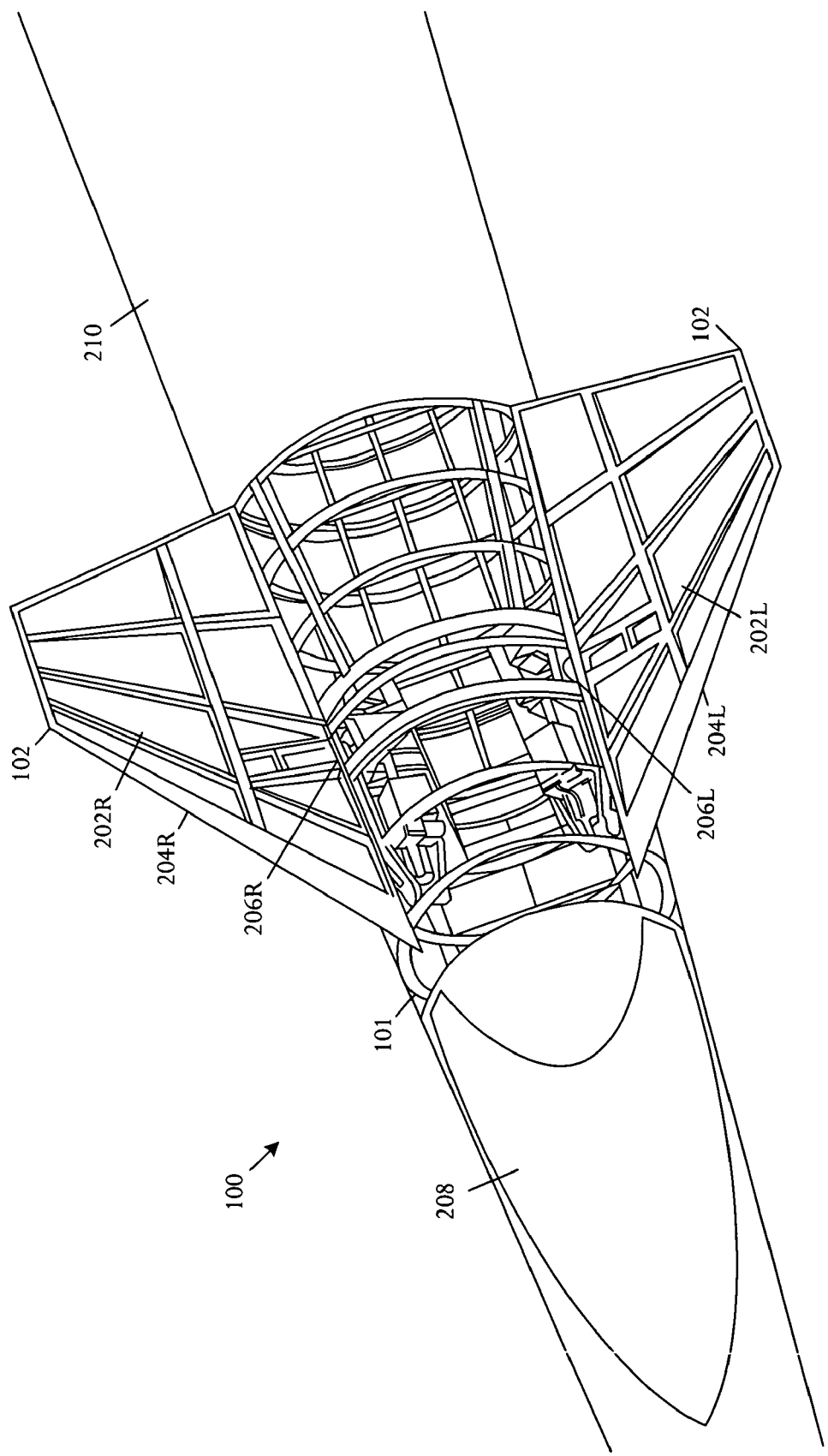
FIG. 3 is a schematic pictorial diagram depicting a top, cut-away view of the aircraft embodiment near the canard.

Referring to FIG. 3, a schematic pictorial diagram depicts a top, cut-away view of the aircraft 100 embodiment in the vicinity of the canard 102. The canard 102 can be particularly effective during takeoff and in high-speed flight. The canard 102 augments the rudder 140 by supplying substantial yaw control power when the left and right canard surfaces are deflected differentially. The diagram shows left and right canard control surfaces 202L and 202R, canard leading edges 204L and 204R, and canard rotation joints 206L and 206R. Also shown is the body or fuselage 101 enclosing a flight crew compartment 208 and a passenger compartment 210. The left and right canard control surfaces 202L and 202R can pivot about the rotation joints 206L and 206R.

Figure 4:
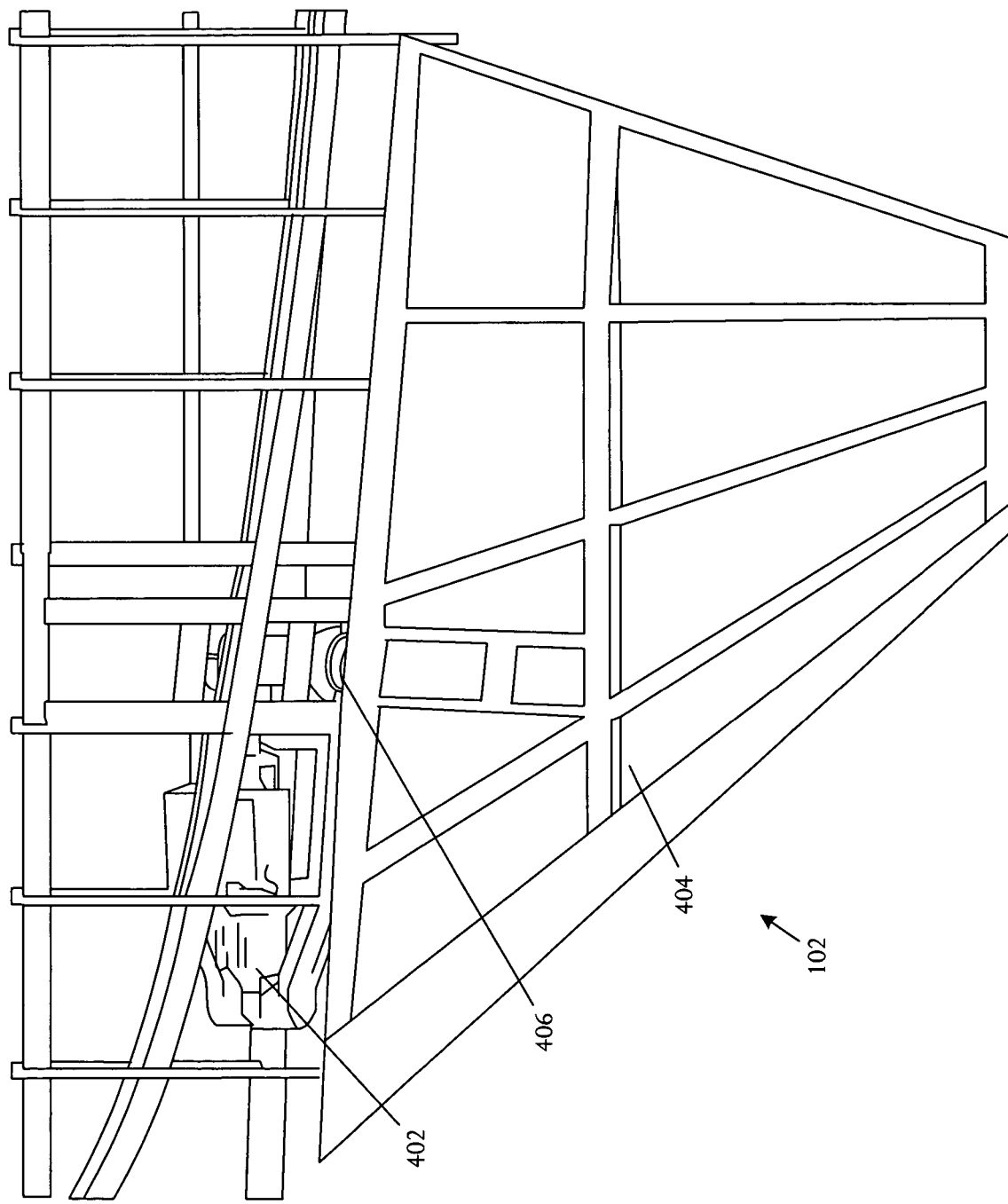
FIG. 4 is a schematic pictorial diagram that shows a top, cut-away view of a left canard.

Referring to FIG. 4, a schematic pictorial diagram shows a top, cut-away view of a left canard 102. The canards 102 are each driven by a linear electromechanical actuator (EMA) 402. In an illustrative embodiment, the canard surface 404 can rotate ±30° about the pivot 406. The canard 102 is used to control pitch and can also be dithered for yaw. The dihedral of the canard enables directional control in addition to pitch control capabilities. In alternative embodiments, a hydraulic actuator can be used to drive motion of the canard. The illustrative electromechanical actuator 402 includes three electric motors for triplex redundancy. To facilitate servicing, the actuator 402 can be accessible for maintenance from inside the aircraft cabin at a position above avionics bays. An advantage of the electromechanical actuator over a hydraulic actuator is lower noise operation, resulting in reduced sound damping between the actuator and the cabin.

The actuators 402 to multiple canards 102 enable differential control of the canards 102 to induce lift on the fuselage 101 and the wing 104 on opposing sides of the body 101 to cause canard lift and body lift to blend into lift produced by the wing 104

Figure 5A:
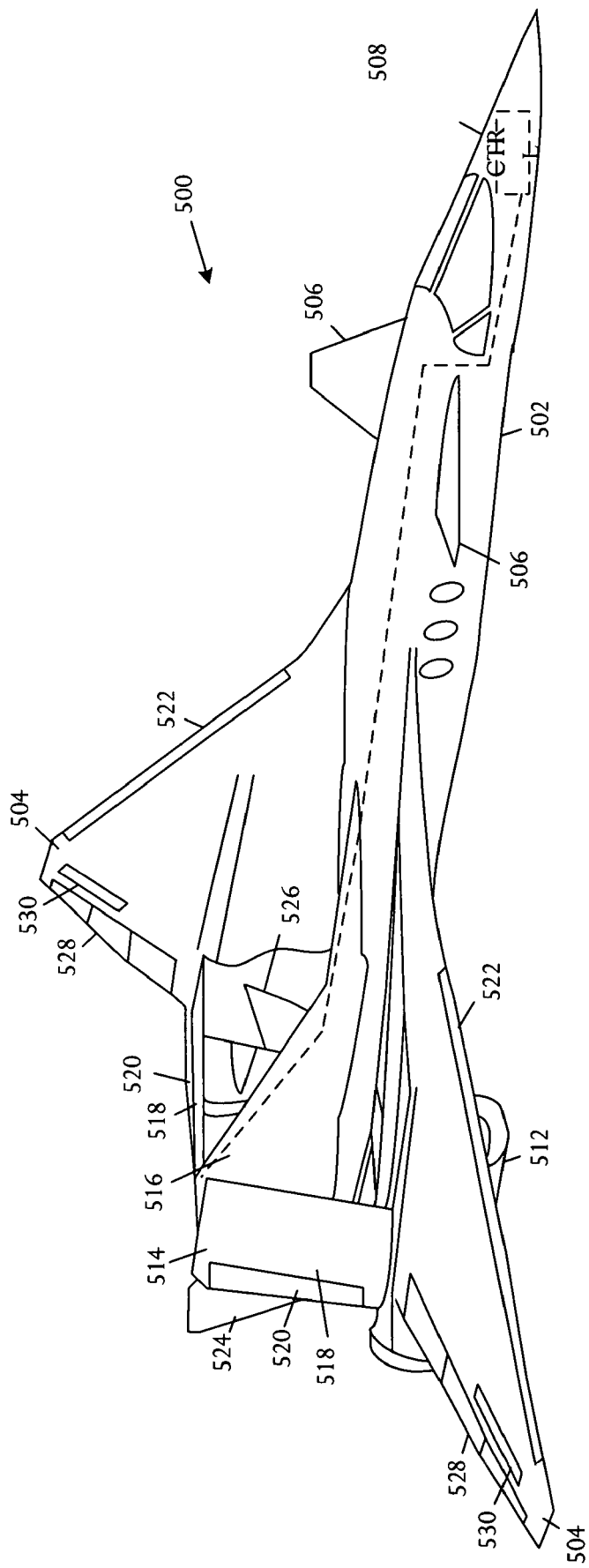
FIGS. 5A and 5B are schematic pictorial diagrams that illustrate side and bottom perspective views of an embodiment of a supersonic aircraft including a controller that manages the aircraft effectors, including the canards to modify the aircraft lift distribution to reduce or minimize the aircraft sonic boom.
Figure 5B:
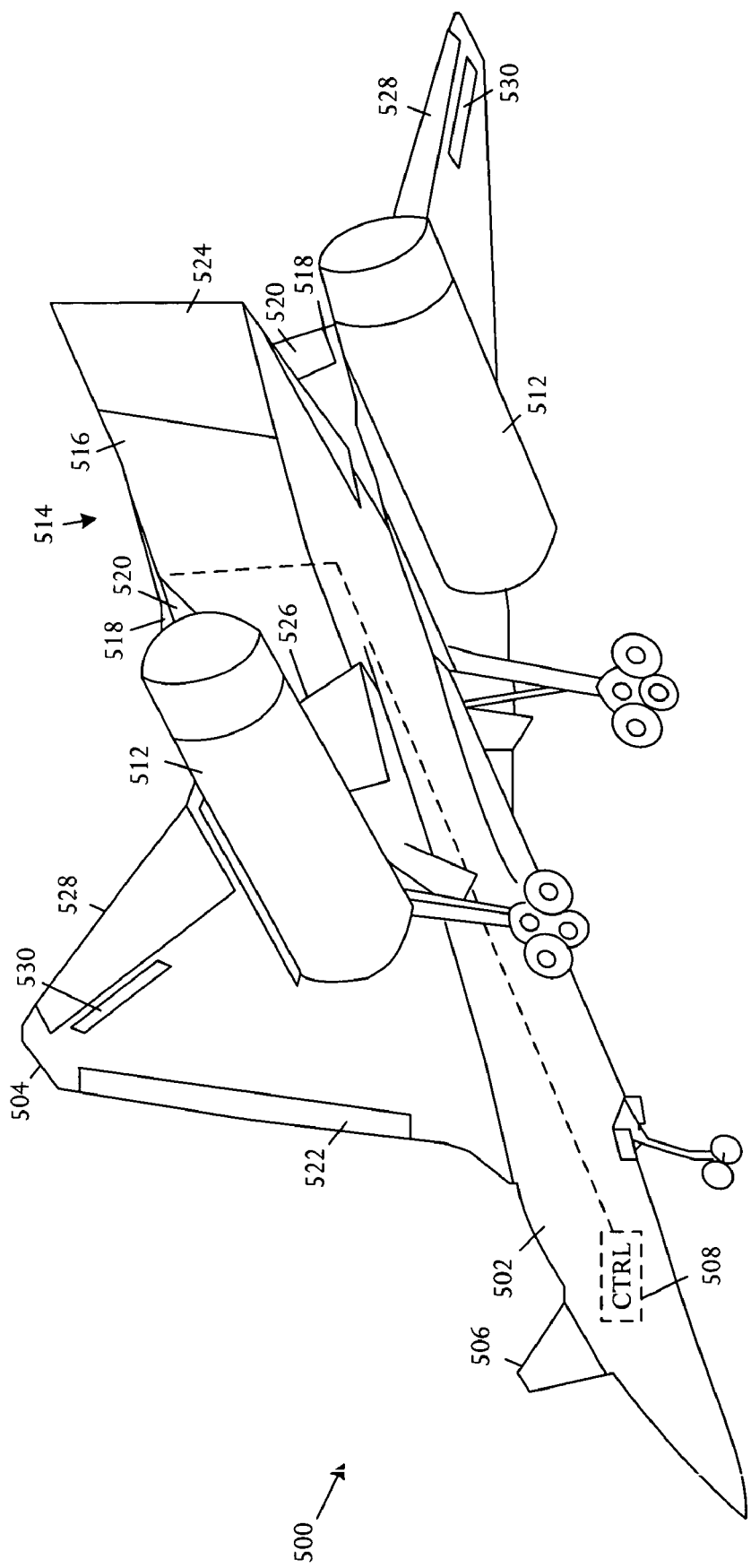

Referring to FIGS. 5A and 5B, schematic pictorial diagrams show side and bottom perspective views of an embodiment of a supersonic aircraft 500. The supersonic aircraft 500 comprises a fuselage 502 that extends forward and aft along a longitudinal axis and has a lower surface and an upper surface. A wing 504 is coupled to the fuselage 502. At least two canards 506 are mounted at elevated positions on opposing sides of the fuselage 502. The canards 506 are capable of independent and differential deflection for directional control. The aircraft 500 further comprises a controller 508 that is communicatively coupled to the canards 506. The controller 508 includes a process for differentially controlling the canards 506 to modify the aircraft lift distribution to reduce or minimize the aircraft sonic boom. The canards 506 have dihedral sufficiently high to increase aircraft lifting length and attain a target equivalent area distribution for low sonic boom performance.

The controller 508 performs analysis and generates signals to direct multiple aircraft systems and control effectors. The illustrative aircraft 500 has an inverted V-tail 514 attached to the fuselage 502 and wing 504. Other embodiments may utilize a different tail configuration, for example a T-tail or other forms. The illustrative inverted V-tail 514 has a central vertical stabilizer 516, inverted stabilizers 518 coupled to sides of the central vertical stabilizer 516 and also coupled to the fuselage 502. The inverted stabilizers 518 assist the fuselage 502 in supporting engine nacelles 512. The inverted V-tail 514 also includes ruddervators 520 that are pivotally coupled to the inverted stabilizers 518 and can have operations managed by the controller 508. Generally, the controller 508 controls the ruddervators 520 to move up and down together for longitudinal control.

The ruddervators 520 can be configured with sufficient torsional stiffness to reduce or minimize flutter resulting from ruddervator rotation coupling with V-tail bending and torsion. Ruddervators 520 have appropriate actuator stiffness and ruddervator torsional stiffness, along with a V-tail mass distribution controlled using ballast weight to manage ruddervator rotation coupling with V-tail bending and torsion. The ruddervators 520 can be symmetrically deflected in combination with the canards to supply pitch control power. The vertical rudder 524 supplies yaw control with roll control supplied by inboard, outboard, and midboard ailerons, and high speed roll spoilers.

The controller 508 also manages other control effectors in combination with the canards 504 and the ruddervators 520, including leading edge Krueger flaps 522, trailing edge flaps 526, ailerons 528, and spoilers 530.

Figure 6:
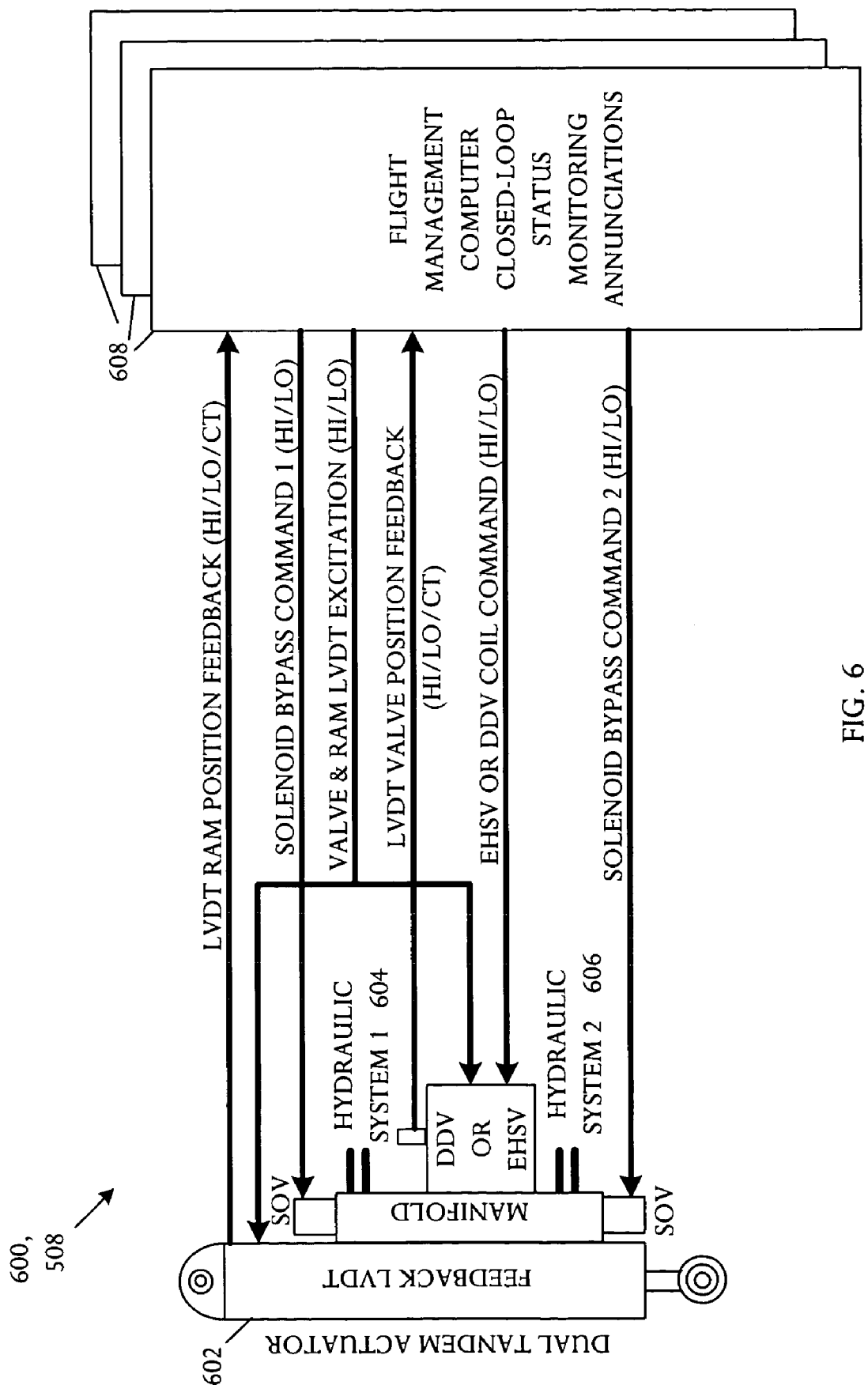
FIG. 6 is a schematic block diagram that shows an example a flight control actuation architecture embodiment that can be used as the controller.

Referring to FIG. 6, a schematic block diagram shows an example a flight control actuation architecture embodiment 600 that can be used as the controller 508. In the illustrative example, primary flight control actuation uses "Fly-by-Wire" dual tandem linear hydraulics with triple electronic redundancy. Dual tandem actuation 602 is powered by two independent hydraulic systems 604 and 606 and sized for full rated performance based on a single system operation. The flight control system is closed-loop and commanded by the Vehicle Management Computers 608. The flight control system 600 performs control law implementations to produce aircraft handling qualities throughout flight. The system 600 can implement outer loop control modes such as Autopilot, Autolanding, and Auto collision avoidance control. The flight control actuation system 600 can also execute system integrity and health management functions. Various types of actuators can be implemented including, for example, Dual Tandem hydraulic actuators, Simplex hydraulic actuators, Rotary vane hydraulic actuators, multiple cylinders hydraulic actuators, integrated rotary electromechanical actuators (IREMA), and the like.

The flight management computers 608 can implement a process that differentially controls the canards 506 to induce lift on the fuselage 502 and the wing 504 on respective opposing sides of the fuselage 502 to cause lift from the canard and body lift to blend into lift produced by the wing. The computers 608 further controls the canards 506 to stretch the aircraft lifting length and tailor the effective area distribution to produce a shaped sonic boom signature. Differential control of the canards 506 can be used to offset effects of the canard dihedral.

The control effector configuration, controlled by the Vehicle Management Computers 608, uses redundant control surfaces, enabling continued safe flight and landing in event of a single actuator failure or mechanically-jammed control surface. Redundancy is extended to the ailerons and ruddervators, which are also designed into multiple surfaces for increased fault tolerance and improved overall safety.

The Vehicle Management Computers 608 implement processes for controlling the effectors, including the canards 102 to distribute lift to reduce or minimize sonic signature and to drive the aircraft to relaxed stability. In an illustrative embodiment, two electronic flight control systems are used to give superior handling qualities and optimal performance throughout the flight envelope. The first system is a full-authority Fly-By-Wire system designed for stability and handling qualities and determining the basic dynamic response of the aircraft.

The second flight control system is an active center-of-gravity (CG) management system. As fuel is burned throughout the mission, the CG management system redistributes the remaining fuel to maximize range and trim to achieve sonic boom signature reduction. The CG management system also enables the canard, wing and inverted V-tail to interact in harmony to lift the vehicle efficiently for maximum range while producing a low sonic boom signature.

Figure 7:
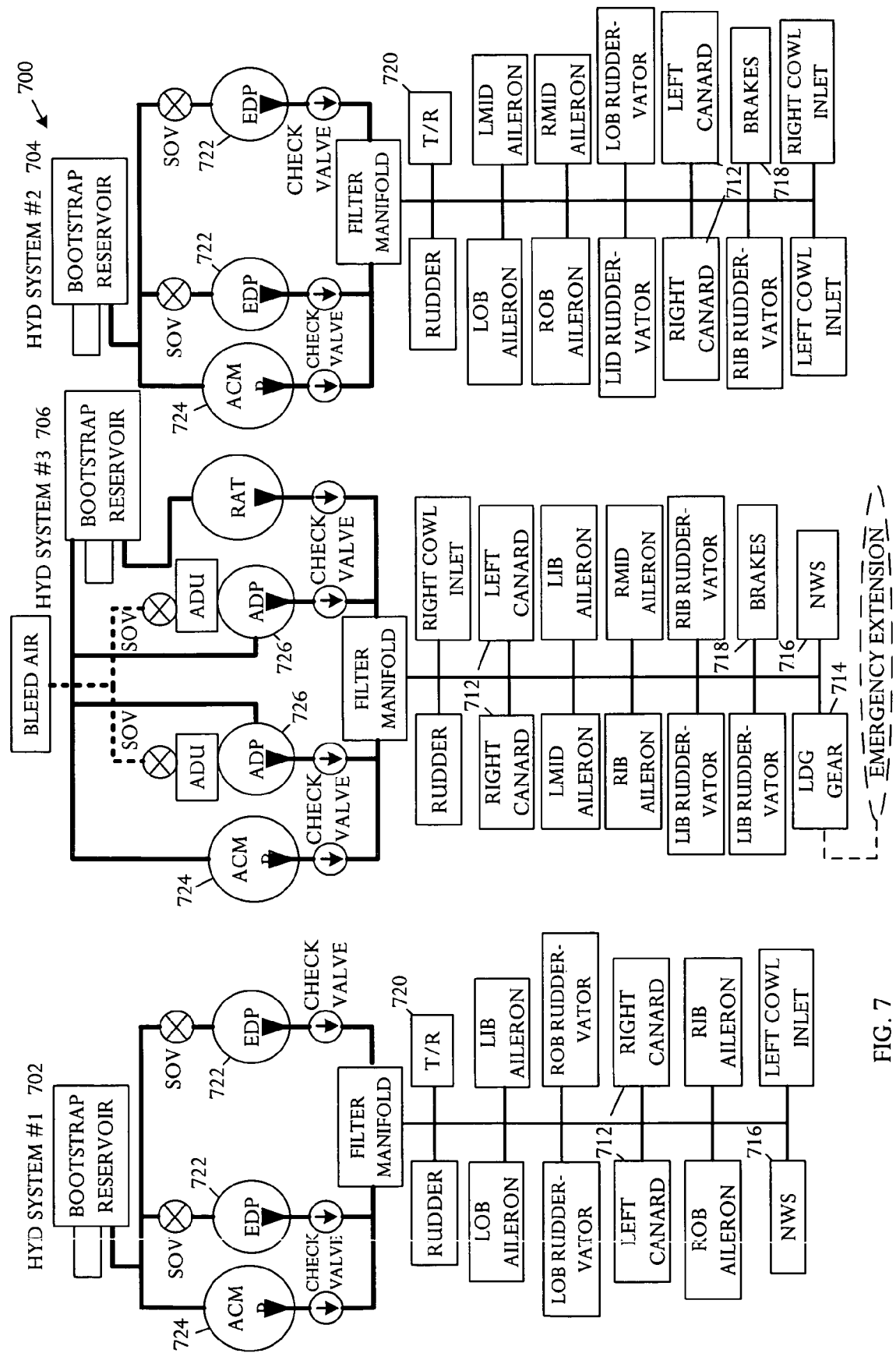
FIG. 7 is a schematic block diagram that depicts an embodiment of a suitable hydraulic power and distribution system architecture for supplying actuating power to the canards and other effectors and systems.

Referring to FIG. 7, a schematic block diagram shows an embodiment of a suitable hydraulic power and distribution system architecture 700 for supplying actuating power to the canards 712 and other effectors and systems. For high reliability, the system 700 is highly redundant with a hydraulic system supplying three independent sources 702, 704, 706 of hydraulic power to operate primary flight controls, landing gear 714, nose wheel steering 716, wheel brakes 718, and thrust reversers 720. The three independent systems 702, 704, 706 give triple redundancy for continued safe flight and landing.

Hydraulic power for the systems is supplied by two engine driven pumps 722 and an AC motor pump 724 on system 1 702 and system 2 704. The engine driven pumps 722 can operate continuously while the AC motor pumps 724 operate on demand basis. Additionally, the AC motor pumps 724 are an extra source of hydraulic power that gives redundancy within each system. The AC motor pumps 724 can be operated on the ground for system checkout without running the engines or using a hydraulic ground carts.

System 3 706 has two air driven pumps 726 and an AC motor pump 724. One air driven pump 726 operates continuously while the other air driven pump 726 and the AC motor pump 724 operate on a demand basis. The AC motor pump 724 in system 3 706 can also be operated on the ground for system checkout without running the engines or using a hydraulic ground cart. System 3 706 also includes a ram air turbine 728 for emergency hydraulic and electrical power in the event of dual engine flameout. The ram air turbine 728 is sized to supply hydraulic and electrical power to essential equipment from the certified altitude to safe landing for level 3 handling quality.

Figure 8:
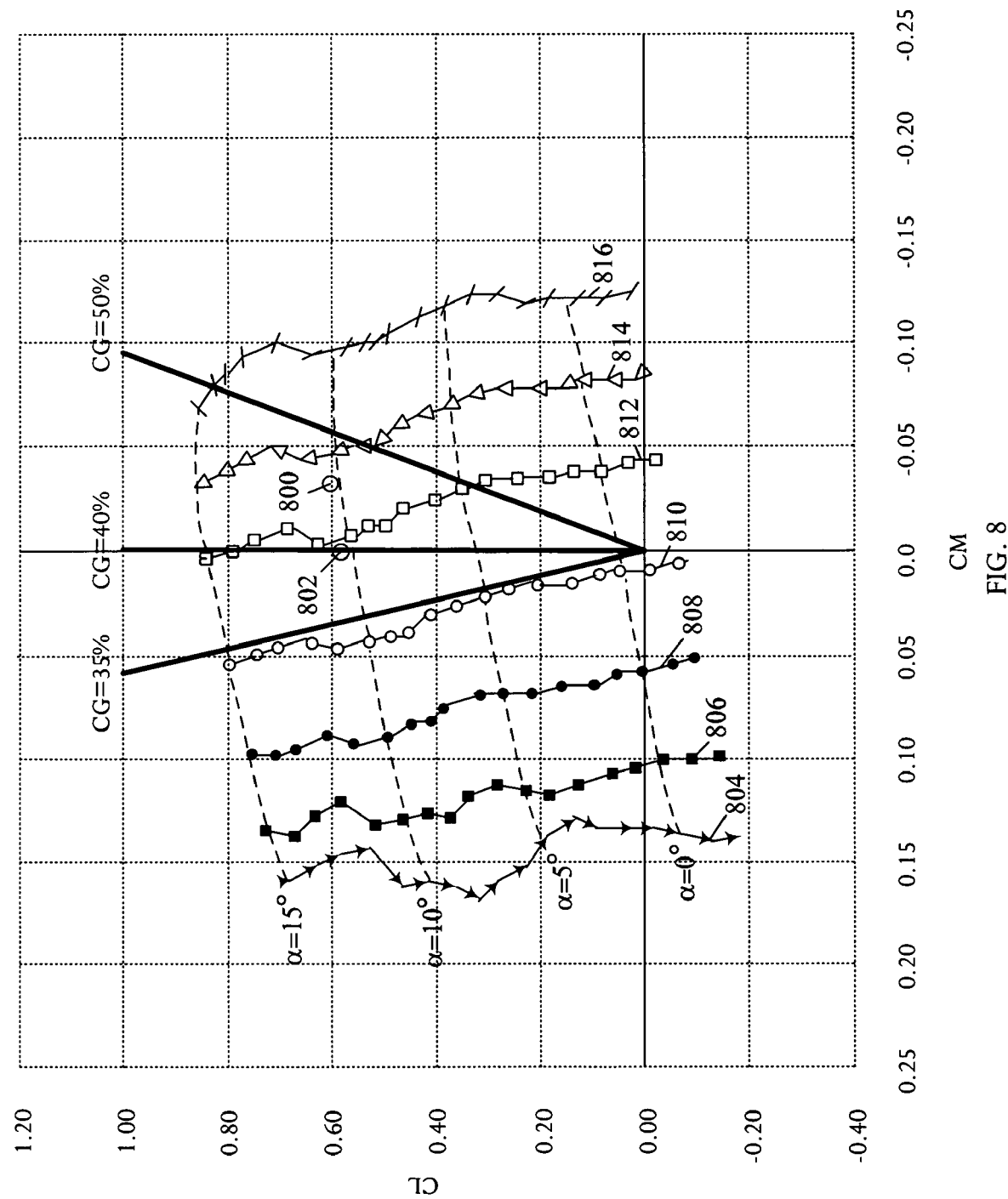
FIG. 8 is a graph showing an example of a control configuration that can be controlled by the Vehicle Management Computers in an embodiment of the supersonic aircraft to attain longitudinal stability and control during takeoff and landing.

Referring to FIG. 8, a graph shows an example of a control configuration that can be controlled by the Vehicle Management Computers 608 in an embodiment of the supersonic aircraft to attain longitudinal stability and control during takeoff and landing. Pitch axis static stability and controllability are assessed by determining the lift coefficient (CL) at a range of aircraft baseline pitch moment coefficients (CM) with all control surfaces at a null position as shown in the graph. The graph shows an example of a nominal center of gravity (CG) range of an aircraft embodiment.

Primary pitch control surfaces include the canard and the ruddervators. Total pitch control power is supplied by full deflections of the canard and the ruddervators, shown in the CL vs. CM plot for the low speed takeoff 800 and landing 802 condition.

In the example, full canard trailing edge down deflection is scheduled as a function of angle-of-attach alpha (α) to prevent canard stall. Full trailing edge down is 30° at α<5°, 20° at α<14°, and 10° at α>14°. Full TE up canard is 30 deg. Intersections of center of gravity (CG) lines with the CL-CM curves are trim controls. Trim control is appropriate for the nominal CG range of the aircraft in takeoff 800 and landing 802 configurations.

In the example, control configurations are defined as canard plus ruddervator deflections from sums of −30 804 to +30 816 at increments of 10.

Figure 9:
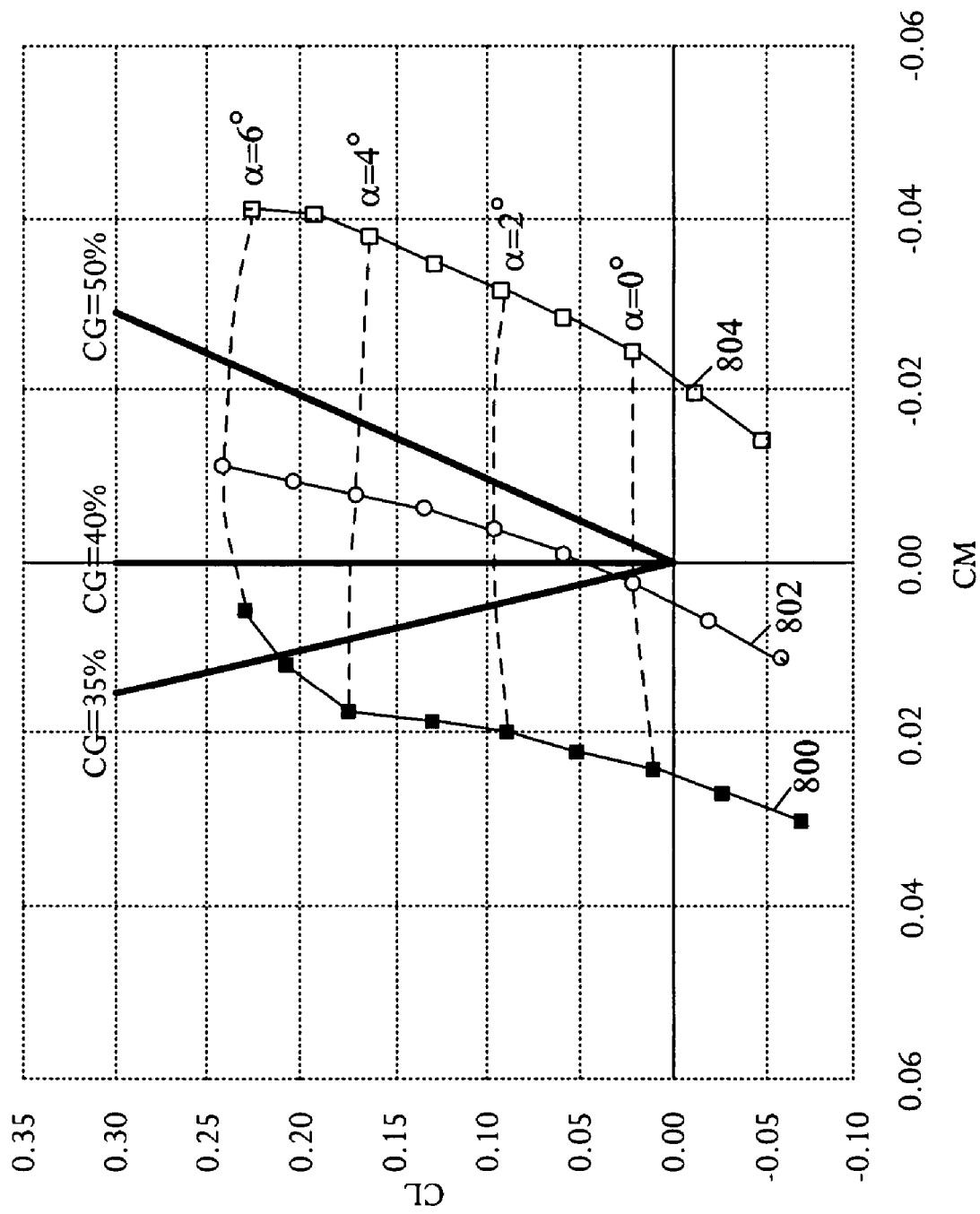
FIG. 9 is a graph illustrating an example of a control configuration that can be controlled by the Vehicle Management Computers in an embodiment of the supersonic aircraft to attain longitudinal stability and control during supersonic cruise.

Referring to FIG. 9, a graph shows an example of a control configuration that can be controlled by the Vehicle Management Computers 608 in an embodiment of the supersonic aircraft to attain longitudinal stability and control during supersonic cruise. The lift coefficient (CL) vs. pitch moment coefficient (CM) plot is depicted for a supersonic cruise condition of Mach 1.8 and includes flexible effects due to aircraft bending. The illustrative aircraft embodiment is stable in the pitch axis in the supersonic cruise condition. Moving the center-of-gravity (CG) aft reduces canard trim. In the center-of-gravity (CG) range from about 40% to approximately 50%, the aircraft has adequate control power for trim for the cruise angle-of-attack a of 2 to 3 degrees.

Figure 10:
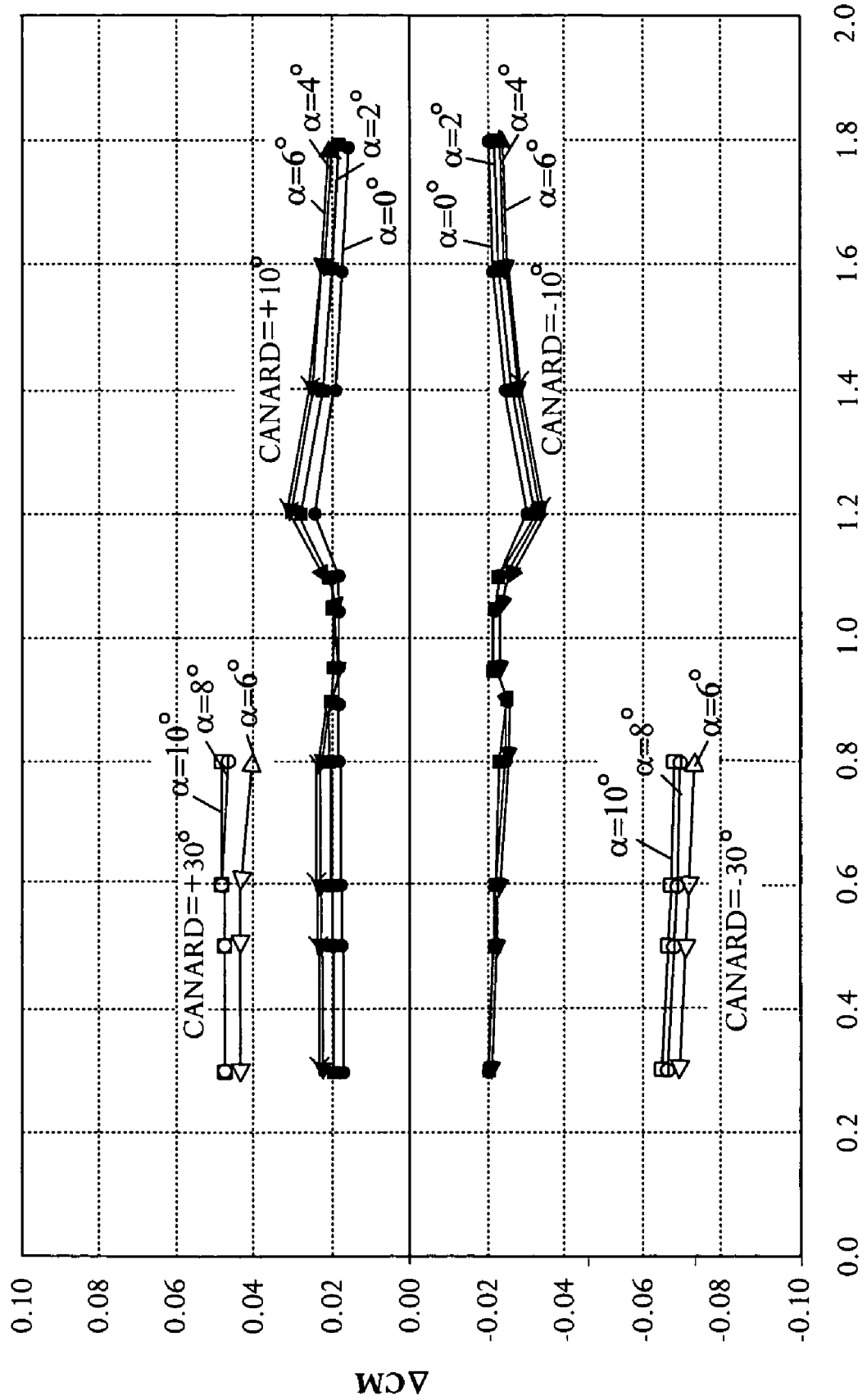
FIG. 10 is a graph that shows an example of canard pitch control effectiveness as managed by the Vehicle Management Computers in an embodiment of the supersonic aircraft.

Referring to FIG. 10, a graph shows an example of canard pitch control effectiveness as managed by the Vehicle Management Computers 608 in an embodiment of the supersonic aircraft. The graph shows pitch control effectiveness of the canard as measured by the pitching moment coefficient $\Delta Cm$ for various angles-of-attack ($\alpha$) and Mach numbers and further depicts flexible effects due to structural bending. Maximum canard deflections of $\pm 30°$ are used for low speeds and $\pm 10°$ for high speeds. With 10° deflection, the canard is effective throughout the Mach range with constant $\Delta Cm$ of approximately 0.02. For higher angles-of-attack ($\alpha$) at low Mach numbers, the canard is more effective pitch down than pitch up, for example −0.07 $\Delta Cm$ as compared to +0.045 $\Delta Cm$. The canard can be supplemented by other control effector surfaces to attain pitch control in the subsonic Mach numbers, particularly during takeoff rotation when large pitch up control moment is used. For low speed operations, combined ruddervator and canard for pitch control can be employed.

Figure 11:
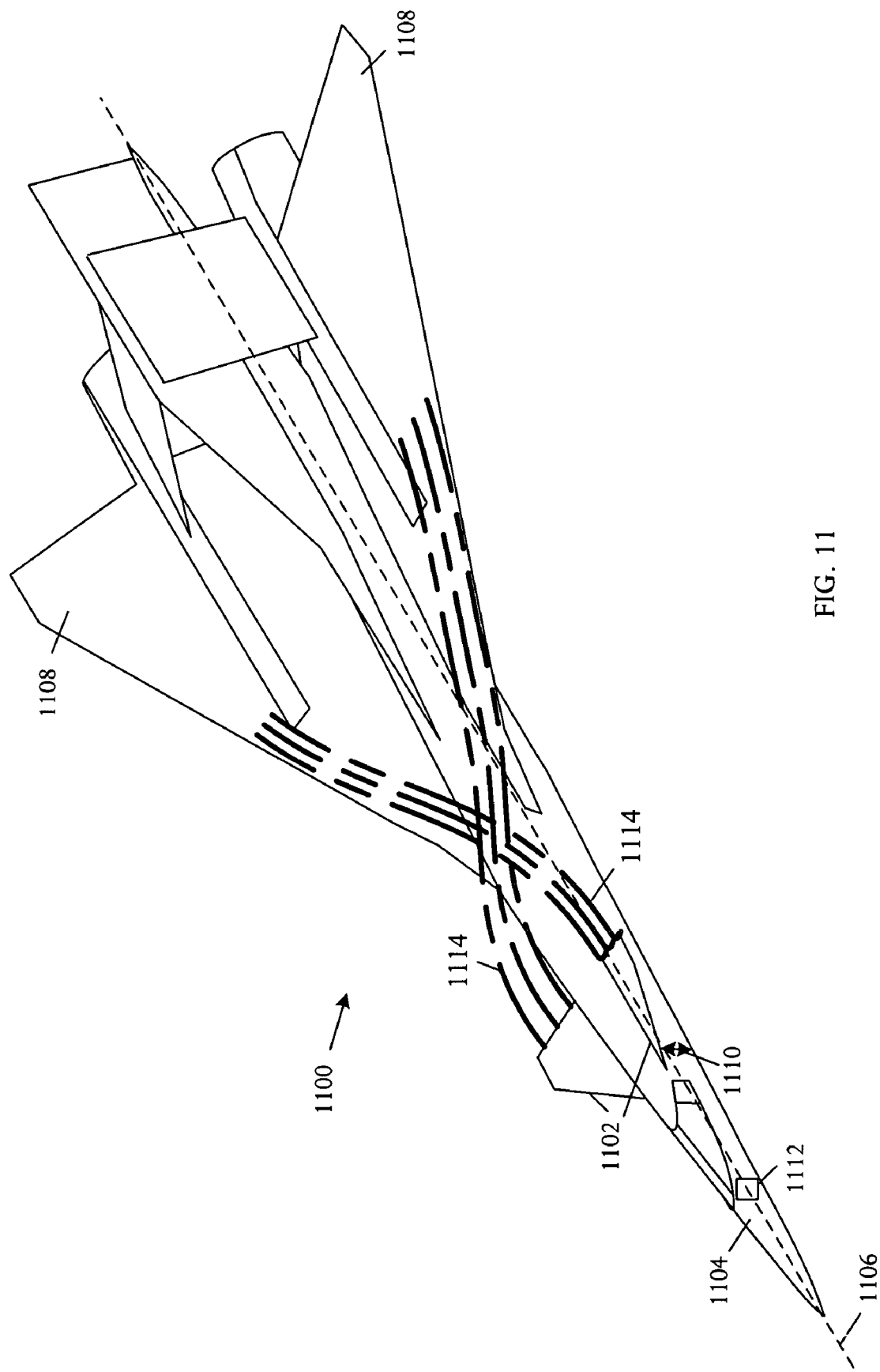
FIG. 11 is a schematic pictorial diagram that illustrates an embodiment of a supersonic aircraft with a canard configured for sonic boom reduction, and pitch and directional control.

Referring to FIG. 11, a schematic pictorial diagram illustrates an embodiment of a supersonic aircraft 1100 with a canard 1102 configured for sonic boom reduction, and pitch and directional control. The aircraft 1100 comprises a fuselage 1104 extending forward and aft along a longitudinal axis 1106 A wing 1108 is mounted to the fuselage 1104. Two or more canards 1102 are mounted on opposing sides of the fuselage 1104 at the elevated position 1110 on the fuselage side. The canards 1102 have differential deflection for directional control. The aircraft 1100 further comprises a controller 1112 that is communicatively coupled to the canards 1102. The controller 1112 is configured to execute a process for symmetrically controlling deflection of the canards 1102 that increases the strength of the trailing edge shock at the fuselage 1104. The shock wraps around the fuselage and intersects the wing leading-edge 1108 on respective opposing sides of the fuselage body 1104, causing a shock cancellation effect whereby the wing leading-edge suction (or expansion) is cancelled by the canard-induced shock.

The dihedral of the canards 1102 is configured so that the wing-tip vortex created by each canard 1102 passes through the inverted V-tail channel and does not impinge on any wing or tail lifting surfaces at either subsonic or supersonic cruise conditions.

Referring to FIG. 12, a graph and schematic pictorial view of an aircraft 1100 show an example of a technique for minimizing or reducing sonic boom effects using the canard 1102. A first graph shows the aircraft lift distribution 1200 along the longitudinal dimension of the aircraft 1100. In the illustrative embodiment, the lift distribution 1200 is a combination of lift resulting from the canard 1202 and lift from the fuselage body and wing including aspects of the aircraft horizontal structure and the propulsion installation 1204.

A second graph shows the aircraft equivalent area distribution 1208 resulting from the aircraft aerodynamic configuration. Jones-George-Seebass-Darden sonic boom minimization theory states a ground signature will have minimum shock strength (ramp signature) by following a calculated equivalent area distribution 1206, defined by a program SEEB, which becomes a design goal. To attain the goal signature defined by the SEEB curve 1206 for predetermined flight conditions of aircraft weight, altitude, and Mach number, a control procedure either deducts from or adds to the configuration equivalent areas. Mach angle cross-sectional areas 1208 of the aircraft configuration can be configured so that the sum of the volume and the lift contributions to the equivalent area distribution is less than or equal to the SEEB curve 400 in a control procedure termed "volume boom-ruling." Alternatively, the aircraft lift distribution can be modified so that the sum of volume and lift equivalent area distributions is less than or equal to the SEEB curve 1206 in a "lift boom-ruling" procedure.

The canards 1102 can be adjusted under control of the controller 1112 to reduce the generation of lift, effectively reducing the equivalent area distribution 1208 as shown in the controlled equivalent area plot that results in an area beneath the SEEB curve 1206.

The equivalent area curve 1208 of the aircraft 1100 shows the increase in effective equivalent area resulting from the canard 1102. To attain the reduced sonic boom goal, the aircraft equivalent area curve 1208 can fall below but not above the SEEB curve 1206.

The canard structure, arrangement, and position are selected in combination with other aspects of the aircraft structure to reduce the equivalent area distribution 1206 as shown in FIG. 12 and to attain suitable trim and roll control characteristics. The canard is positioned to meet area distribution characteristics for a low sonic boom aircraft and further positioned so that the trailing edge shock of a canard and fuselage junction on one aircraft side wraps around the fuselage in a crossing pattern and strikes the leading edge of the wing on the opposing side of the aircraft.

Figure 13C:
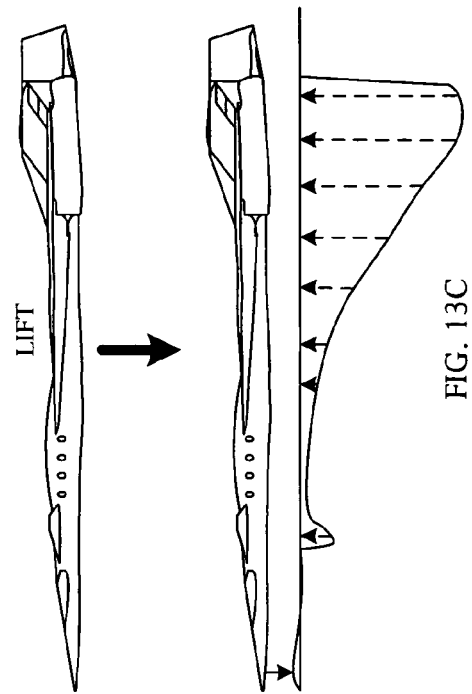
FIGS. 13A, 13B, 13C, and 13D is a series of graphs illustrating the theory upon which a low sonic boom signature is attained by controlling deployment of the canard, reducing sonic boom loudness while maintaining long supersonic range.
Figure 13D:
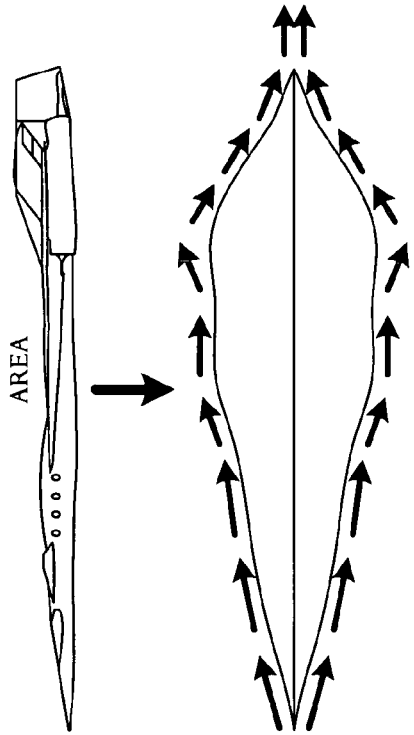
Figure 13A:
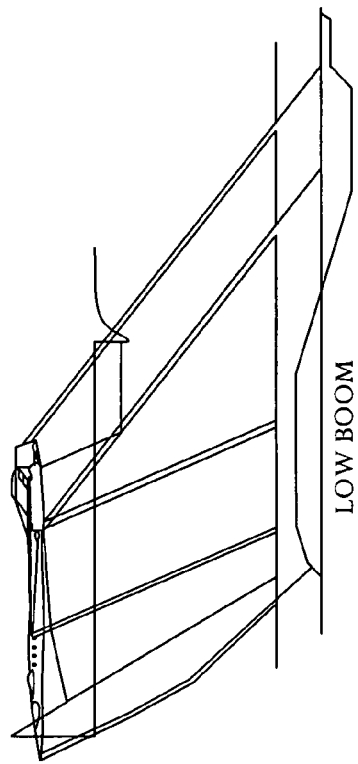
Figure 13B:
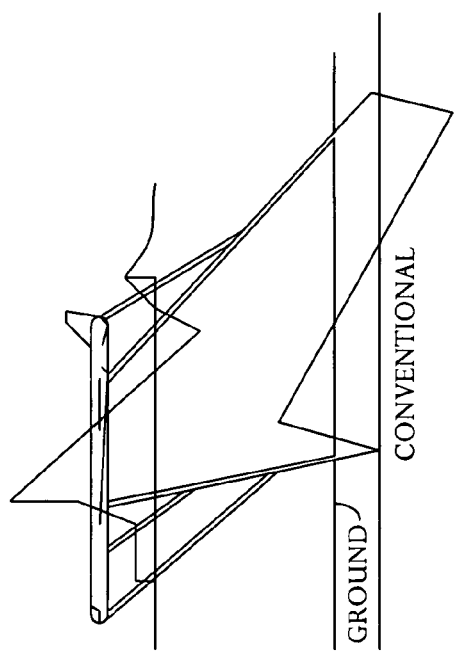

Referring to FIGS. 13A, 13B, 13C, and 13D, a series of graphs illustrate theory upon which a low sonic boom signature is attained by controlling deployment of the canard, reducing sonic boom loudness. FIG. 13A is a graph showing a near-field pressure cut from a conventional supersonic aircraft. The pressure distribution coalesces into an N-wave at the ground, a shape corresponding to the largest overpressure shock strength and thus the greatest loudness. One technique for reducing sonic boom amplitude at the ground involves a minimization theory in which a pressure distribution caused by a low boom aircraft follows an inversely calculated distribution to generate low shock strength at the ground. Contrary to intuition, a low boom distribution occurs when a strong leading edge compression quickly reduces in magnitude, followed by a gradually increasing weak compression that rapidly inverts into a weak expansion, followed by a stronger trailing edge compression that gradually recompresses to ambient. Boom minimization occurs when an aircraft produces the aforementioned inversely-calculated pressure distribution. The pressure distribution produced by an aircraft results from a Mach angle averaged, cross-sectional area distribution, for example as shown in FIG. 13B, and a Mach angle lift distribution, as shown in FIG. 13C. The elevated position of the canard on the fuselage in combination with a capability for differential deflection operates to modify the lifting length of the aircraft and achieve a target equivalent area distribution for low sonic boom, thereby shaping the active area distribution to reduce sonic boom amplitude at the ground. A minimized pressure distribution is shown in FIG. 13D and occurs when the sum of the area pressure distribution and the lift pressure disturbance is equal to the minimized pressure distribution. The canards described herein can be used to shape the pressure distribution at off-design conditions, for example when operating at a different Mach number or angle of attack than the optimized design conditions.

Figure 14:
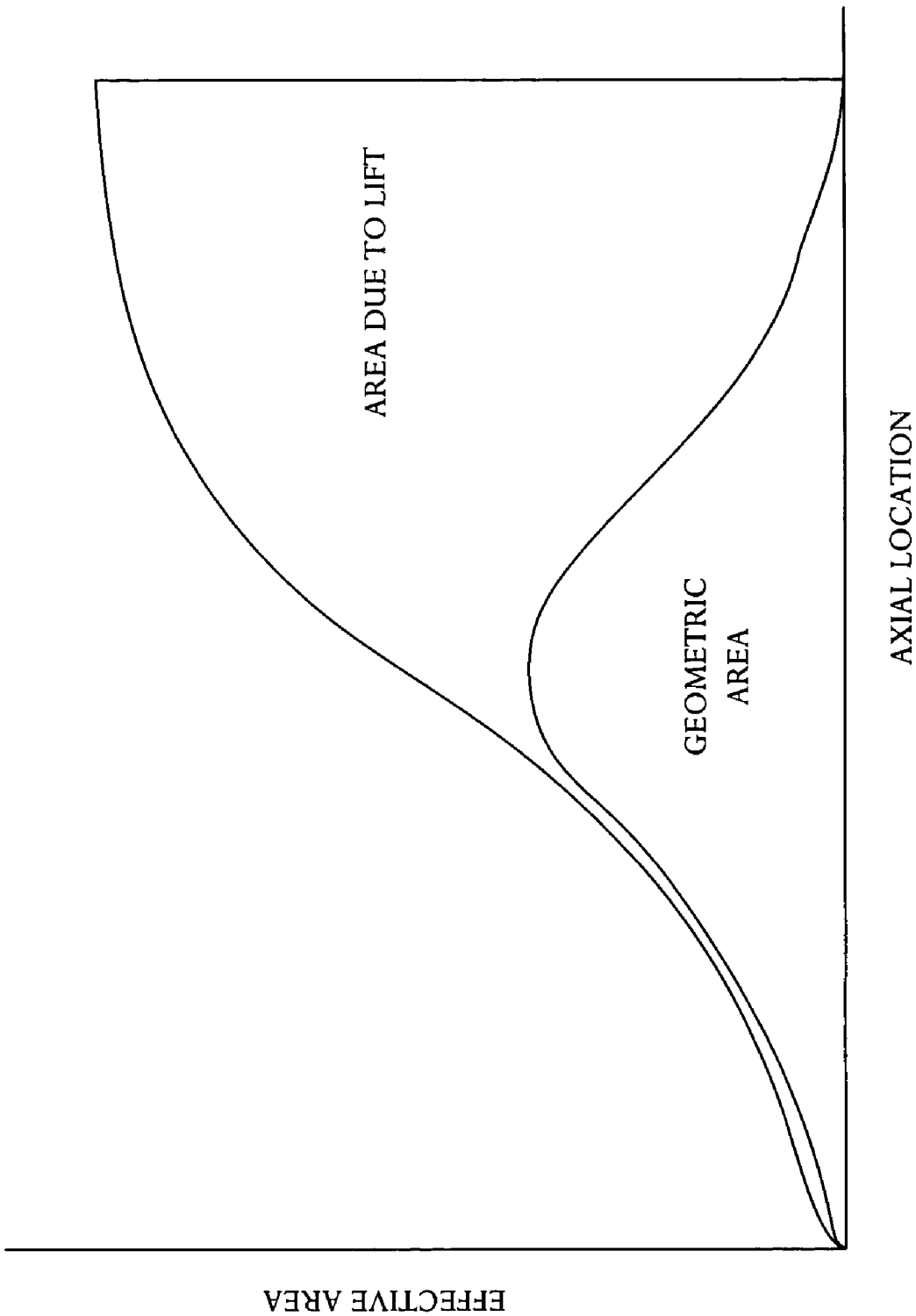
FIG. 14 is a graph that further illustrates theory of equivalent area minimization to reduce sonic boom signature, showing effective area against axial location along the longitudinal axis of the aircraft.

The canard is designed to attain a selected lift distribution to meet a low sonic boom performance constraint. Aspects of the design include canard position and canard dihedral. For example, the canard position is configured to attain an area distribution with relatively blunt profile as shown in FIG. 14, a distribution that results in a low amplitude sonic boom signature. The canard dihedral and canard position may be designed to allow the area distribution to dip below the SEEB curve and/or to touch the SEEB curve.

In an illustrative embodiment, the canard may be configured in terms of position on the fuselage, structure, and control operations. The longitudinal position of the canard on the fuselage is selected taking into consideration other structural aircraft aspects such as fuselage, wing, and tail structure and position to attain a stable and appropriate trim that results in a selected reduced or minimized sonic boom condition. Longitudinal position of the canard and design of the tail may be further iterated to attain a suitable combination that results in a center-of-gravity and center-of-pressure aligning to also maintain a suitable trim condition, resulting in an appropriate equivalent area due to lift distribution for a reduced or minimum sonic boom signature. Accordingly, the canard is positioned to trim the aircraft at a stable and suitable angle-of-attack range to attain a selected sonic boom performance condition.

The technique further includes selection of canard chord/span, dihedral, incidence, twist, horizontal and vertical location to improve or at least maintain the low sonic boom equivalent area distribution. Both cord and span are linked by planform area and aspect ratio requirements dictated by stability and control requirements and off-design constraints. Variables determining canard horizontal and vertical location on the fuselage, as well as chord length are selected so that the trailing edge shock from the canard on one side of the aircraft wraps around the fuselage and cancels disturbances of leading edge upper surface expansion of the wing leading edge on the side of the fuselage opposing the canard. Accordingly, the variables are selected to set canard position on the fuselage such that the wing tip vortex produced by the canard avoids striking either the wing leading edge or the leading edge of the aircraft tail at cruise. A canard design that forms a wing tip vortex which avoids the tail leading edge facilitates a laminar flow on the inverted V tail.

The canard and aircraft design for which the canard creates a suitable wing tip vortex can be determined using shock cancellation analysis applying computational fluid dynamics (CFD) to trace the shock. For example, CFD may be used to analyze inverse characteristics, such as a Mach cone for linear flowfield, from the leading edge of the wing. Mach cone analysis enables determination of the position of the trailing edge of the canard and the vertical location of the canard on the fuselage. The canard and aircraft configuration results in a sonic boom profile constraint for low sonic boom performance, enables reduction or minimization of drag, and aircraft integration including stability and trim at supersonic cruise conditions.

Increasing canard dihedral causes multiple effects including aircraft lifting length enhancement to attain a target equivalent area for low sonic boom. Increased canard dihedral also enables a pilot to exploit asymmetry in control of canards on opposing sides of the aircraft for directional control.

The canard dihedral can also be structured and the canards may be differentially controlled to enable yaw control and roll control, thereby facilitating lateral and/or directional control of the aircraft.

Design factors in arranging the canards accordingly include selection of canard incidence, possibly with some canard twisting and dihedral, selection of vertical position of the canards on the fuselage, and longitudinal positioning of the canard on the fuselage at a position relative to the wing that produces a low sonic boom profile.

In some embodiments, the canards have an all-moving surface whereby the entire canard moves and/or rotates with respect to the fuselage. An all-moving configuration, in combination with a strong dihedral, couples longitudinal motion with lateral and directional stability so that the canards are not only useful for aircraft trim but also assist in aircraft directional control and lateral control. For example, asymmetric deflection of the left and right canards, for example one canard deflected upward while the canard on the opposing fuselage side deflected downward, generates a yawing motion, enhancing directional control authority in combination with operations of the rudder and deflections of other control surfaces.

Referring to FIG. 14, a graph further illustrates theory of equivalent area minimization to reduce sonic boom signature, showing effective area against axial location along the longitudinal axis of the aircraft. When the sum of the lift and the equivalent area due to geometric area, called a volume contribution, results in a minimized distribution, a minimized ground sonic boom occurs. The canard positive deflection can induce lift on the body due to the upper canard leading edge expansion. Lift from the canard thus stretches the lifting length to move the active area distribution closer to the distribution that shapes the sonic boom signature.

Generally, the canard and aircraft configuration is selected by multiple-variable analysis of flow fields produced by the aircraft whereby the number of variables is equal to the number of objectives. Canard variables typically include horizontal position relative to the aircraft wing, vertical position on the fuselage, incidence and twist, dihedral, canard span and aspect ratio, and reference area. For N variables, N requirements, also called unknowns, are set. In one example of an analysis technique, canard area is determined according to lateral and directional considerations. Typically, a suitable canard surface area or range of surface areas is determined to attain an appropriate trim condition. Canard area is selected for stability. Incidence, more specifically the angle of incidence for canard lofting with respect to the canard symmetry plane, is selected to attain a trim condition. The vertical location for positioning the canard on the fuselage is determined according to sonic boom considerations, for example by analyzing lift and stretch attained by elevating canard position. Longitudinal location of the canard with respect to the wing leading edge along the fuselage is selected to cancel opposing side expansion of the wing by tracing the flow field characteristics ahead of the wing leading-edge at the body junction. The amount of dihedral is selected so that the vortex from the canard trailing edge passes interior to the tail channel and does not strike the wing leading edge and trailing edge of the tail surfaces. The canard trailing edge is positioned in the fuselage section in such a way that the shock or expansion cancels the expansion or shock generated at the leading edge of the opposing wing and aircraft body and/or the leading edge of the wing at the fuselage junction. The canard configuration thereby generates a crossing pattern of the shock on one side of the fuselage to the wing on the opposing aircraft side. Other variables may be analyzed, such as reference area, aspect ratio, and many others. Operational specifications are maintained for the analysis of all variables.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although a particular aircraft geometry and configuration is described, the canards and techniques for controlling the canards can be utilized in aircraft with different geometries. In particular, although the described aircraft has an inverted V-tail configuration, other tail configurations such as T-tail configurations and others may be used. Although the described aircraft have two canards, in other embodiments, other suitable aircraft can have additional canards. The described propulsion configuration includes two engines mounted at aft positions in a highly swept wing. Other suitable embodiments may have different engine configurations with fewer or more engines, with engines mounted on the fuselage or tail rather than on the wing, or mounted above rather than beneath the wing.

What is claimed is:

1. A supersonic aircraft comprising:
   a fuselage extending forward and aft;
   wings coupled to lateral sides of the fuselage; and
   canards coupled to lateral sides of the fuselage forward of the wings, the individual canards being configured to generate shocks that wrap around the fuselage and intersect with wing leading edges on opposing sides of the fuselage.

2. The aircraft according to claim 1 further comprising:
   the individual canards being configured to cause a shock cancellation effect whereby leading edge suction and/or expansion is canceled by the canard-generated shock wrapped around the fuselage.

3. The aircraft according to claim 1 further comprising:
   the canards coupled at a position on the fuselage forward of the wings and at an elevation that attains a target equivalent area distribution for low sonic boom whereby active area distribution reduces sonic boom amplitude at ground level.

4. The aircraft according to claim 1 further comprising:
   the canards configured with sufficiently high dihedral that enhances aircraft lifting length to attain a target equivalent area for low sonic boom and that enables asymmetric differential control on canards on opposing aircraft sides for lateral directional mode control.

5. The aircraft according to claim 1 further comprising:
   an inverted V-tail coupled to the fuselage aft of the canards and forming a channel; and
   the canards configured with positioning and structure whereby wing tip vortices from the canards pass through the inverted V-tail channel, avoiding impingement on leading edges of the wings and the inverted V-tail.

6. The aircraft according to claim 5 further comprising:
   the canards configured with positioning forward of the wings and the inverted V-tail arranged in combination whereby the aircraft center-of-gravity and center-ofpressure align to maintain trim and have an equivalent area due to lift distribution to attain a minimum sonic boom signature.

7. The aircraft according to claim 1 further comprising:
the canards comprising an all-moving surface whereby an entire canard moves and/or rotates in relation to the fuselage.

8. A supersonic aircraft comprising:
a fuselage extending forward and aft;
wings coupled to lateral sides of the fuselage;
canards coupled to lateral sides of the fuselage forward of the wings and having controllable aerodynamic surfaces; and
a controller coupled to the canards and adapted to control the canard controllable aerodynamic surfaces, the canards being configured and controlled to generate shocks that wrap around the fuselage and intersect with wing leading edges on opposing sides of the fuselage.

9. The aircraft according to claim 8 further comprising:
the canards being configured and controlled to cause a shock cancellation effect whereby leading edge suction and/or expansion is canceled by the canard-generated shock wrapped around the fuselage.

10. The aircraft according to claim 8 further comprising:
an inverted V-tail coupled to the fuselage aft of the canards and forming a channel; and
the canards configured with positioning and structure and controlled by the controller whereby wing tip vortices from the canards pass through the inverted V-tail channel, avoiding impingement on leading edges of the wings and the inverted V-tail.

11. The aircraft according to claim 10 further comprising:
the canards configured with positioning forward of the wings and the inverted V-tail arranged in combination whereby the aircraft center-of-gravity and center-of-pressure align to maintain trim and have an equivalent area due to lift distribution to attain a minimum sonic boom signature.

12. The aircraft according to claim 8 further comprising:
the canards configured with sufficiently high dihedral that enhances aircraft lifting length to attain a target equivalent area for low sonic boom; and
the controller adapted to asymmetrically and differentially control canards on opposing aircraft sides for lateral directional mode control.

13. The aircraft according to claim 8 further comprising:
the individual canards being configured to cause a shock cancellation effect whereby leading edge suction and/or expansion is canceled by the canard-generated shock wrapped around the fuselage.

14. The aircraft according to claim 8 further comprising:
the canards comprising an all-moving surface; and
the controller moves and/or rotates an entire canard in relation to the fuselage.

15. A method for implementing canards on an aircraft comprising:
performing a multiple-variable analysis of flow fields produced by an aircraft including a fuselage with canards and wings coupled to lateral sides of the fuselage; and
configuring the canards to generate shocks that wrap around the fuselage and intersect with wing leading edges on opposing sides of the fuselage based on the multiple-variable analysis.

16. The method according to claim 15 further comprising:
performing the multiple-variable analysis whereby the number of variables is equal to the number of objectives, including analysis of variables comprising horizontal canard position in relation to the wings, vertical canard position on the fuselage, canard incidence and twist, canard dihedral, canard span and aspect ratio, and canard reference area.

17. The method according to claim 15 further comprising:
selecting a range of canard surface area that attains a predetermined trim and stability condition;
selecting canard vertical position on the fuselage that attains a selected lift and a selected aircraft equivalent area stretch; and
selecting canard longitudinal position relative to the wing leading edge that opposes wing side expansion.

18. The method according to claim 17 further comprising:
selecting canard dihedral whereby a vortex from the canard trailing edge passes interior to a tail channel of the aircraft and avoids striking leading edges of the wings and tail.

19. The method according to claim 15 further comprising:
selecting canard longitudinal and vertical positioning whereby a shock or expansion from the canard trailing edge cancels the expansion or shock generated at a leading edge of the wing on an opposite side of the fuselage from the canard.

20. The method according to claim 15 further comprising:
performing a shock cancellation analysis by applying computational fluid dynamics to trace a shock and analyzing inverse Mach cone characteristics for a linear flowfield from a leading edge of the wing.

* * * * *